Jan. 5, 1926.                                          1,568,785
W. WESTBURY
POT AND KILN CONSTRUCTION
Filed Sept. 23, 1924        2 Sheets-Sheet 1
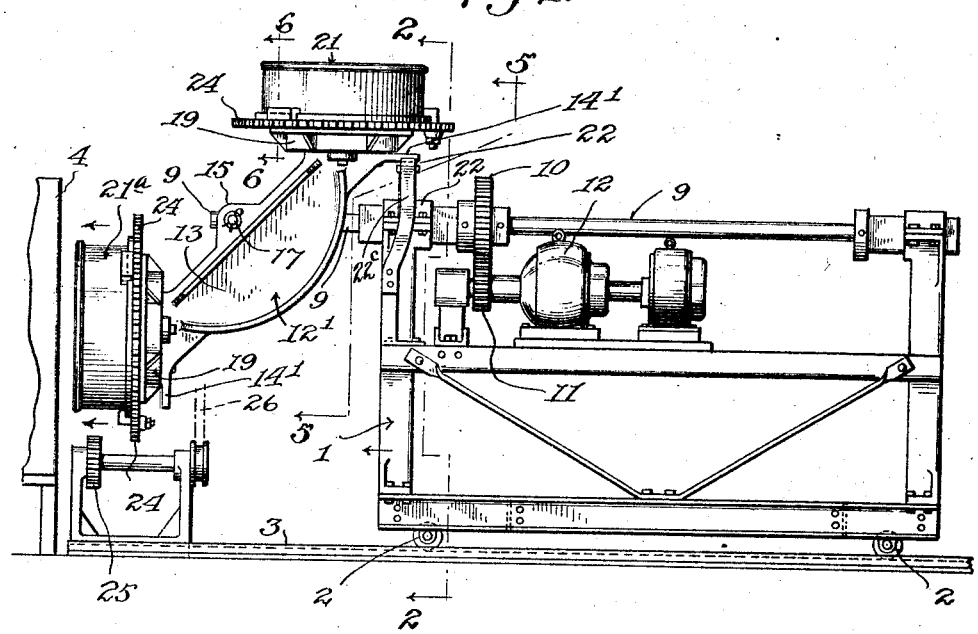
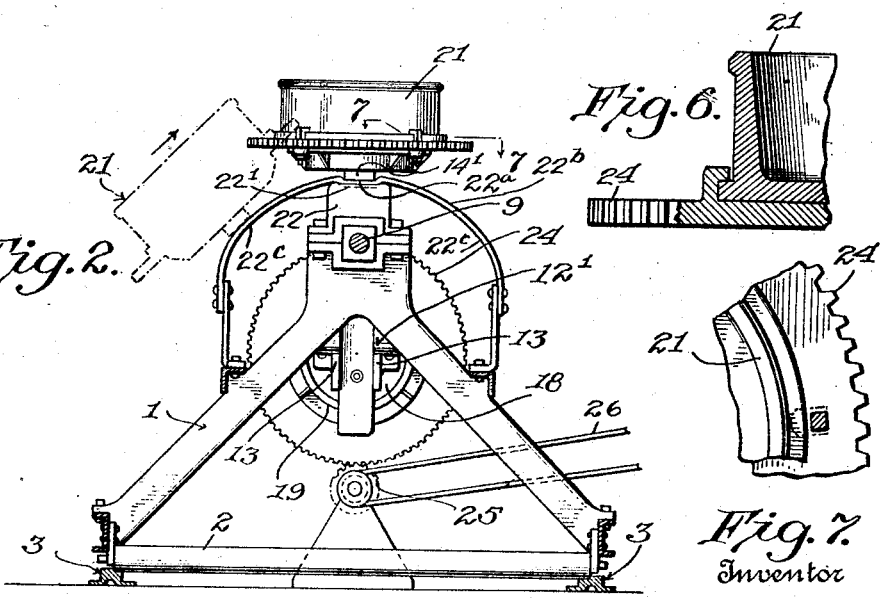
Inventor
William Westbury,
By
C. C. Hines
Attorney

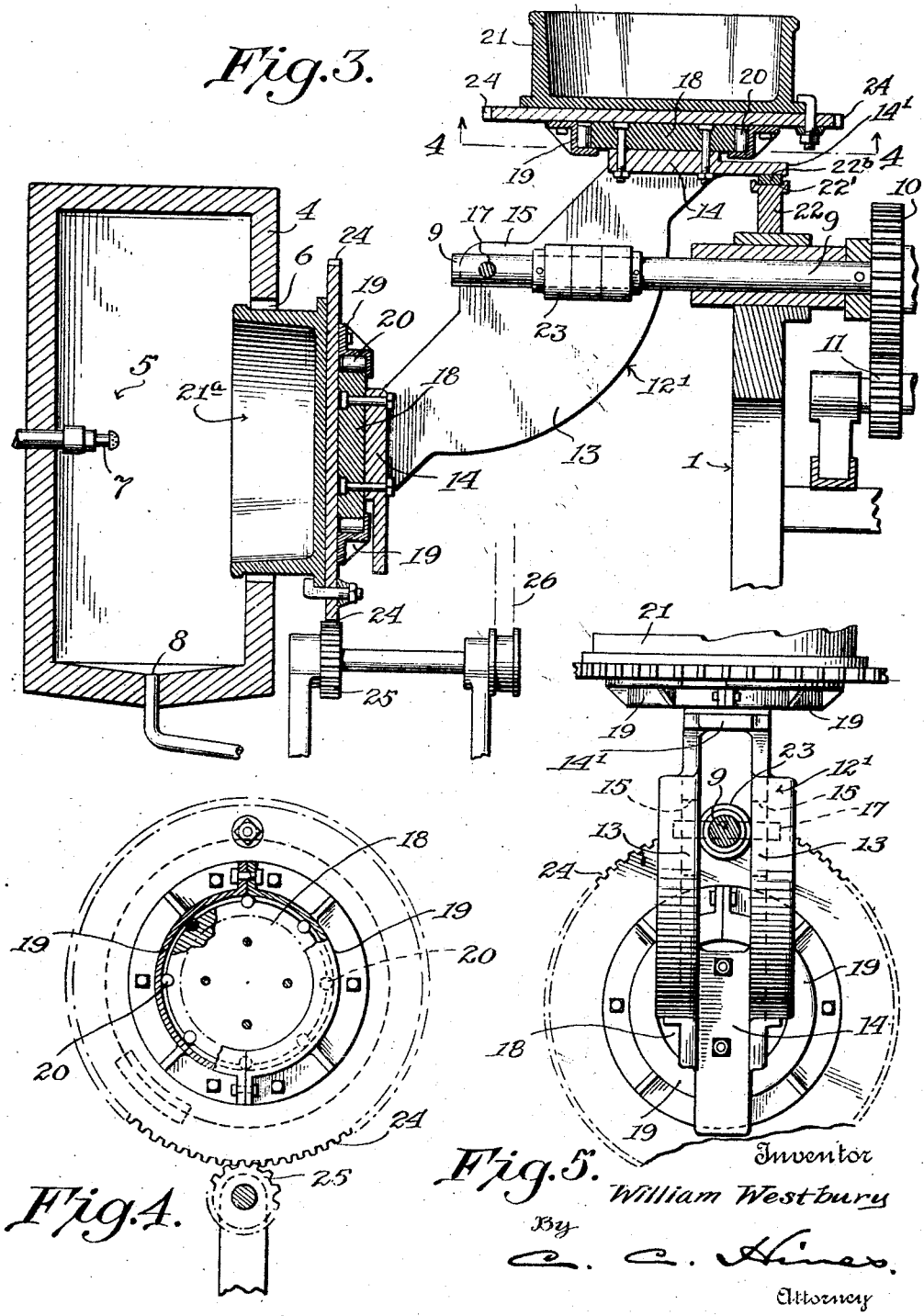

Patented Jan. 5, 1926.

UNITED STATES PATENT OFFICE.

WILLIAM WESTBURY, OF CANASTOTA, NEW YORK,

POT AND KILN CONSTRUCTION.

Application filed September 23, 1924. Serial No. 739,367.

*To all whom it may concern:*

Be it known that I, WILLIAM WESTBURY, a citizen of the United States, residing at Canastota, in the county of Madison and State of New York, have invented new and useful Improvements in Pot and Kiln Constructions, of which the following is a specification.

This invention relates to pot and kiln constructions, and has particular reference to double reversible glass drawing pots employed in drawing glass cylinders and which are movable alternately between drawing and draining positions and arranged for cooperation with a heating kiln operative for melting the aftermath from either pot when disposed in drawing position.

One object of the invention is to provide novel means for mounting and reversing the pots whereby, when one pot is in horizontal drawing position, the other or inverted pot will be arranged in a vertical position for registry with the mouth of a kiln formed in a vertically disposed kiln wall, toward and from which kiln the pot structure is movable, allowing ready and convenient movement of the pot to be heated into and out of the kiln mouth.

Another object of the invention is to provide novel and improved means, including a reversing shaft and a pot carrying frame or support pivotally mounted thereon, for reversing the pots, combined with means upon the shaft for guiding and preventing binding of the pot carrying frame or support and ensuring its easy swinging movements on its pivotal connection.

Still another object of the invention is to provide novel means for mounting the pots upon the pot carrying frame or support, whereby the pots may be readily applied to and removed from the said pot carrying frame or support, for convenience in detaching a pot for repairs or other purposes and substituting a new pot in its place.

Still another object of the invention is to provide a construction whereby, when a pot is in draining position, it may be revolved a part way around on its axis for a better concentration of the heat and melting out of the aftermath from different portions of the pot, or whereby the pot may be continuously revolved so that any remaining amount of the aftermath, which can not be readily removed, may be spread over the interior surface of the pot in a manner to fill all voids or crevices therein, thereby coating the surface of the pot to prevent the formation of air bubbles or other flaws or imperfections in the draw from the charge of glass with which the pot is subsequently supplied.

Still another object of the invention is to provide means for checking and cushioning the swing of the pot carrying frame and for holding the pots firmly and positively against casual swinging movement when the pots are respectively disposed in position for drawing and drainage actions.

With these and other objects in view, the invention consists of the features of construction, combination and arrangement of parts, hereinafter fully described and claimed, reference being had to the accompanying drawings, in which:—

Figure 1 is a side elevation of a pot and kiln structure embodying my invention, showing one of the pots in drawing position and the other pot in readiness to be shifted to draining position.

Figure 2 is a vertical transverse section on line 2—2 of Figure 1.

Figure 3 is a vertical longitudinal section through the pot structure with the pots properly disposed for drawing and draining operations.

Figure 4 is a section on line 4—4 of Figure 3.

Figure 5 is a section on line 5—5 of Figure 1.

Figure 6 is a section on line 6—6 of Figure 1.

In the practical embodiment of my invention I provide a main supporting frame or carriage 1, of suitable construction for the purpose, and having at its base transverse rollers 2 mounted for travel on track rails 3, whereby the frame 1 and pot mechanism carried thereby, as hereinafter described, may be moved toward and from the front wall 4 of a heating kiln 5 arranged adjacent to and in spaced relation to the forward end of the frame 1. The wall 4 of the kiln 5 is vertically disposed and provided with a mouth or opening 6, and said kiln is heated by one or more burners 7. The bottom of the kiln is formed with an opening 8 for the discharge of the refuse glass or aftermath from the pots.

Journaled upon the main supporting frame or carriage 1 is a horizontal shaft 9 carrying a gear 10 meshing with a gear pinion 11 on the shaft of an electric or other suitable drive motor 12, whereby the shaft 9 may be revolved. The forward end of the shaft 9 extends beyond the forward end of the frame 1, into the space between the same and the front wall 4 of the kiln 5 and forms a support for a pot carrier body 12'. This body 12' is arcuately curved or sector-shaped and formed of spaced walls 13 connected at their ends by end plates or heads 14, each having a projecting arm or extension 14'. The sector-shaped body 12', as shown in the present instance, is substantially of semicircular form, its straight side facing forwardly and its curved side or periphery facing rearwardly. The projecting forward end of the shaft 9 extends between the walls 13 of the body 12' from front to rear thereof, the extremity of said shaft terminating between ears 15 formed upon the straight sides of the walls 13. These ears 15 are perforated for passage of a pin 17, which pivotally connects the body 12' with the shaft. Through this pivotal connection the body 12' is adapted to swing with the shaft 9, when the latter is turned or rotated, and also adapted to swing or pivot on the pin 17 as an axis of motion, on a line at right angles to its direction of motion with the shaft 9. The curved rear edges of the body 12' are spaced to provide an arcuate guide slot, allowing free pivotal motion of the body on the shaft.

Secured to each end disk or head 14 of the body 12' is a pot carrying frame comprising a circular head 18 and an annular rim member 19 peripherally embracing said head. These heads 18 and rim members 19, therefore, are adapted to rotate with the body 12' and shaft 9 and to swing with the body 12' on the pivotal connection 17. The inner face of each rim 19 is formed to provide an annular track or raceway receiving rollers or other anti-friction bearings 20 suitably mounted upon or within the periphery of the head 18, whereby the rim 19 may be easily revolved upon the head as an axis upon the application of a predetermined amount of propelling power applied thereto.

The rims 19 of the two carrier heads support pots 21 and 21ª, which pots are thus arranged in positions at right angles to each other, the arrangement being such that when one of the pots, as the pot 21, for example, is disposed in an upper horizontal drawing position, the other pot, as the pot 21ª, will be disposed in a vertical draining position, in which draining position the pot 21ª is disposed so as to be shifted by the longitudinal back and forth movements of the carriage or main supporting frame 1 on the track rails 3 into and out of the kiln through its mouth 6. The arrangement is also such that when the two pots 21 and 21ª are respectively in the drawing and draining positions described, the arm or extension 14' of the end plate 14 carrying the pot 21 will rest firmly and securely upon a seat or saddle 22 rigidly mounted on the forward end of the carriage 1. The top face of this saddle may be recessed, as at 22', to receive the offset or depressed central portion 22ª of a stiff bowed spring guiding and cushioning member 22ᵇ, the said central portion of which extends across the top of the saddle and the end portions 22ᶜ of which extend downwardly at opposite sides of the saddle and are secured to the frame of the carriage 1. When the spring is relieved of the weight of the pots the central portion thereof lies slightly above the plane of the top of the saddle, and such portion of the spring is adapted to be depressed by the weight of either arm 14' resting thereon so as to force the offset portion 22ª of the spring into the recess, thus supporting and locking the spring against any tendency to give or yield in a direction transversely of the carriage. The offset 22ª also forms a locking notch or keeper to receive the arm 14' and hold the same locked against casual shifting of the pots when in proper position for the drawing and draining operations, while permitting free movement of the arm 14' in either direction for a pot reversing action under power applied to and from the shaft 9. The end portions 22ᶜ of the spring 22ᵇ serve as track rails on which the arm 14' of either pot carrying head may travel in the movement of a pot into and out of drawing position on a rotary reversing motion of the shaft 9 in either direction. Said portions also serve in this connection as cushioning bumpers or shock absorbers to receive and cushion the pressure and weight of the pot structure in its turning movement on the pivot 17, thereby allowing of a smooth reversing action free from shocks or jars. A very simple construction of means is thus provided for guiding and cushioning the motion of the pot structure in the pot turning or revesing action. Each pot 21 and 21ª may be detachably mounted upon its carrier rim 19 in any suitable manner, allowing a warped, damaged or worn out pot to be readily and conveniently removed and another pot to be substituted in its place.

In order to further guide the body 12 in its pivotal movements on the shaft 9, and to properly govern and control the pivotal motions thereof, a friction roller guide in the form of one or more wheels or rollers 23 may be mounted to loosely revolve in a fixed plane on the shaft 9 between the walls 13, and to run peripherally in contact with said walls. This roller guide thus prevents lateral or sidewise motion of the body 12 as it swings, and further reduces strain on the pivot 17, and, by its frictional engagement with the walls 13, it also serves to check the movement of the body 12 and to operate as a friction brake to prevent slamming. The use of a sectional roller or series of these rollers, as shown, is regarded as preferable in order to afford a long roller bearing surface and to adapt the portions of such surface to have varying rotary speeds according to the arcs of travel of the portions of the walls 13 on which they bear.

Figure 1 shows the pots in the position they occupy preliminarily to the charging of the pot 21 for a draw and the shifting of the pot 21$^a$ into the kiln 5 for the melting out therefrom of the aftermath from the previous draw, the pot 21$^a$ being arranged in advance of and in alinement with the kiln mouth 6 so that upon a forward movement of the frame 1 it will be shifted into the kiln, as shown in Figure 2, so that the aftermath therein will be melted out by the heat of the flames from the burner or burners 7 while the operation of drawing a cylinder from the charge in the pot 21 is taking place. Upon the movement of the pot 21$^a$ into the kiln for the operation described, the pot 21 is filled with a charge of glass and the drawing operation proceeded with in the usual way. At the conclusion of this drawing operation, the frame 1 is moved backward on the track rails 3, so as to withdraw the pot 21$^a$ from the kiln, and then the shaft 9 is given a half revolution through power applied to the gears 10 and 11 from the motor 12 to reverse the positions of the pots 21 and 21$^a$. In this reversing operation the body 12 carrying the pots rotates with the shaft 9, thus elevating the pots 21$^a$ and lowering the pot 21, and, as these pots 21 and 21$^a$ reach a certain position in such half revolution of motion, the body 12 swings by gravity on the pin 17 as an axis, whereby the pot 21 is shifted from a position parallel with the plane of the shaft 9 to a position at right angles thereto and the pot 21$^a$ reversely shifted, the pot 21 finally assuming the position formerly occupied by the pot 21$^a$ and the pot 21$^a$ assuming the position formerly occupied by the pot 21. The pot 21$^a$ is thereby brought into horizontal drawing position and the pot 21 into vertical position as shown in Figure 1, the pot 21 therefore being in position to be shifted forward by the movement of the frame 1 into the kiln 5 for the drainage operation and the pot 21$^a$ being thereby disposed in position to be filled with a charge of glass for the drawing of a cylinder therefrom. It will thus be seen that by successive half revolutions of the shaft 9, and corresponding pivotal motions of the body 12 on its axis 17 in reverse directions, upon such successive half revolutions of the shaft 9, the pots 21 and 21$^a$ may be alternately and successively shifted back and forth into drawing and draining position subject to a shifting of the lower pot into the melting kiln and its subsequent withdrawal therefrom. When the pots are arranged in their proper drawing and draining positions, any motion thereof is prevented by the firm resting of the upper pot on the seat 22 and the engagement of the lower pot with the walls of the kiln, as will be readily understood.

Any suitable means may be employed for rotating each pot carrying rim 19 and the pot carried thereby when the pot is in draining position. As shown in the present instance each rim 19 is provided with peripheral gear teeth 24, adapted, when the pot carried thereby is shifted into draining position, to come into meshing engagement with a suitably supported drive gear 25 arranged in proximity to the heating kiln and adapted to be driven by a chain or belt 26 or other means from any suitable source of power. By this means when a pot is disposed in draining position, and after a portion of the aftermath has been melted from that portion of the pot which is uppermost, the pot may be turned or rotated through an arc of 180°, more or less, on its axis, so as to dispose that portion of the pot which has been lowermost at the highest position, allowing the aftermath to be melted and drained therefrom with the greatest facility, and thereby ensuring the rapid and efficient melting of the greater portion of the aftermath from all parts of the interior of the pot. This arrangement further allows the burners to be disposed so as to concentrate their heat upon a portion of the pot, for example, the upper portion of the pot, so that the flames may be projected into the pot to the best advantage for an aftermath melting operation. By this method of heating the pot and draining out the aftermath, the discharge of a large proportion of the refuse glass may be effected with the pot arranged in a vertical draining position, and without the necessity of completely inverting the pot. Furthermore, by means of the gearing described the pot may be continuously revolved after the major portion of the aftermath has been removed, so as to spread the remainder of the refuse glass over the interior surface of the pot, by the action of centrifugal force, causing all voids or pits to be filled. The pot thus treated when withdrawn from the kiln and the glazed surfacing allowed to harden, provides a smooth surfaced charge receiving chamber to receive the charge of glass from which the cylinder is to be drawn, whereby the formation of air pockets and roughened surfaces which cause blisters and other imperfections in the cylinder being drawn are prevented, as will be readily understood.

In practice, the carrier or main supporting frame 1 may be shifted back and forth on its trackway 3 by hand power or by mechanical power as may be desired or required under different conditions of service.

Figure 1 shows the arrangement of parts of the apparatus when the pot 21 is in drawing position and the pot 21ª in draining position, in which positions the pots are locked against rotary motion on or with the shaft 9 and until said shaft is positively actuated. With the parts thus arranged, a forward motion of the carriage 1 will result in the pot 21ª being shifted into the mouth of the furnace 5 and the gear 24 being shifted into engagement with the gear 25, as shown in Figure 3. The pot 21 may then be filled with a charge of glass and the drawing operation carried on while the interior of the pot 21ª is being subjected to the heat of the furnace 5 for the purpose of melting out the aftermath or refuse glass therefrom. While the draw is in progress from the pot 21, and after a determined portion of the glass in the pot 21ª has been melted and drained therefrom, leaving a certain proportion of the aftermath remaining, the gear 25 may be set into action to rotate the pot 21ª, whereby the melted glass therein will be spread over the surface of the pot chamber, filling all voids or crevices, so that upon the removal of said pot from the furnace and the hardening of the glass therein the interior of the pot chamber will be glazed so as to avoid the formation of air pockets in the charge of glass with which the pot 21ª is to be supplied for the succeeding draw. The draw being completed from pot 21, as well as the draining and glazing action as applied to pot 21ª, the carriage 1 is moved backward to withdraw the pot 21ª from the furnace 5, whereby the parts are restored to the position shown in Figure 1, whereupon the shaft 9 may be rotated for a reverse action to bring the pot 21ª into drawing position and the pot 21 into draining position, as will be readily understood.

Having thus fully described my invention, I claim:—

1. In glass drawing apparatus, a pair of drawing pots, a rotary shaft, a connecting member between the pots, a pivotal connection between the shaft and connecting member adapting said member to rotate with the shaft and to swing thereon in its rotating motion, and a plurality of grouped rollers loose on the shaft and at different distances from the pivotal connection with which the connecting member contacts on its swinging motion.

2. In glass drawing apparatus, a pair of pots, a rotary reversing shaft, a connecting member between the pots coupled to the shaft to turn therewith and to swing thereon for shifting the pots alternately between horizontal drawing and vertical draining positions, a stationary support on which the pot moved to drawing position is adapted to seat, and pot guiding means in the path of motion of the pots leading to said support.

3. In glass drawing apparatus, a pair of pots, a rotary reversing shaft, a connecting member between the pots coupled to the shaft to turn therewith and to swing thereon for shifting the pots alternately between horizontal drawing and vertical draining positions, a stationary support on which the pot moved to drawing position is adapted to seat, and resilient pot guiding means located in the path of motion of the pots leading to and from said support.

4. In glass drawing apparatus, a pair of pots, a rotary reversing shaft, a connecting member between the pots coupled to the shaft to turn therewith and to swing thereon for shifting the pots alternately between horizontal drawing and vertical draining positions, a stationary support on which the pot moved to drawing position is adapted to seat, and means leading to and from said support for cushioning the pots on their reversing motion.

5. In glass drawing apparatus, a pair of pots, a rotary reversing shaft, a connecting member between the pots coupled to the shaft to turn therewith and to swing thereon for shifting the pots alternately between horizontal drawing and vertical draining positions, a stationary support on which the pot moved to drawing position is adapted to seat, and combined cushioning and guiding trackway for the pots leading to said seat.

6. In glass drawing apparatus, a pair of pots, a rotary reversing shaft, a connecting member between the pots coupled to the shaft to turn therewith and to swing thereon for shifting the pots alternately between horizontal drawing and vertical draining positions, a stationary support on which the pot moved to drawing position is adapted to seat, and a curved resilient guide for the pots at a point in their path of travel leading to said seat.

7. In glass drawing apparatus, a pair of pots, a rotary reversing shaft, a connecting member between the pots coupled to the shaft to turn therewith and to swing thereon for shifting the pots alternately between horizontal drawing and vertical draining positions, a stationary support on which the pot moved to drawing position is adapted to seat, and a single means for guiding and cushioning the pots in their turning movement and on the movement of a pot into drawing position.

8. The combination with a heating kiln having a vertical wall provided with a mouth or opening, of a carriage movable toward and from the said wall of the kiln, a rotary shaft carried by said carriage, a pair of drawing pots, and a connecting member between the pots and holding them at right angles to each other, said connecting member being mounted to rotate with the shaft and to swing thereon for shifting the pots between vertical and horizontal positions, in which vertical position a pot is disposed so as to be shifted into and out of the kiln mouth by reverse movements of the carriage.

9. In glass drawing apparatus, a rotary reversing shaft, a pair of pots, a connecting member between the pots mounted to rotate with and to swing upon the shaft, a stationary support having a recess seat, projections on the connecting member adapted for respective engagement with said recess seat when one of the pots is disposed in drawing and the other pot is disposed in draining position, and guiding means engageable by said projections for guiding the same to and from said seat.

10. In glass drawing apparatus, a rotary reversing shaft, a pair of pots, a connecting member between the pots mounted upon the shaft to rotate therewith and swing thereon, projections carried by said connecting member in alinement with the pots, a stationary support having a seat adapted to be engaged by said projections, and a resilient track rail leading to and from the seat and engageable by said projections.

11. In a glass drawing apparatus, a rotary reversing shaft, a pair of pots, a connecting member between the pots mounted upon the shaft to turn therewith and swing thereon, projections carried by said connecting member in alinement with the pots, a stationary support provided with a seat, and curved guide rails on opposite sides of said support leading to and from said seat and forming track rails on which the projections are adapted to travel.

12. In glass drawing apparatus, a kiln having a vertical wall provided with a mouth or opening, a carriage movable toward and from said kiln, a rotary reversing shaft mounted on said carriage, a pair of pots movable between horizontal drawing and vertical draining positions, and a connecting member between said pots mounted upon the shaft to turn therewith and swing thereon, the construction being such that either pot is adapted when in draining position to be disposed in front of the mouth of the furnace and to be shifted into and out of said mouth by forward and backward movement of the carriage.

13. In glass drawing apparatus, a pair of pots, a rotary reversing shaft, a connecting member between the pots coupled to the shaft to turn therewith and to swing thereon for shifting the pots alternately between horizontal drawing and vertical draining positions, a stationary support having a locking notch or recess, a projection on the connecting member contiguous to each pot adapted for engagement with said locking notch or recess when the pot moves into drawing position, and a guideway adapted to be engaged by each projection and leading to and from the locking notch or recess.

14. In a glass drawing apparatus, a rotary reversing shaft, a pair of pots, a connecting member between the pots mounted on the shaft to rotate therewith and swing thereon, a support provided with locking means, and means carried by the connecting member for locking engagement with said locking means when the member is shifted to dispose either pot in drawing position and the other pot in draining position.

15. In glass drawing apparatus, a kiln having a vertical wall provided with a mouth or opening therein, a carriage movable toward and from said wall, a rotary reversing shaft on the carriage, a pair of pot carrying heads, a connecting member between said heads pivoted to the shaft to turn therewith and swing thereon, pots rotatably mounted on the heads and each provided with a gear rim, said pots being shiftable through a half revolution of the shaft alternately between horizontal drawing and draining positions, in which draining position each pot is disposed in advance of and in alinement with the kiln mouth and is shiftable back and forth in said mouth by movements of the carriage, and a suitably driven gear arranged to be engaged with and disengaged from the gear rim of a pot disposed in draining position, by such shifting movements of the carriage.

In testimony whereof I affix my signature.

WILLIAM WESTBURY.